(12) United States Patent
Puidokas

(10) Patent No.: US 10,668,571 B2
(45) Date of Patent: Jun. 2, 2020

(54) NANOPARTICLE POWDERS, METHODS FOR FORMING BRAZE PASTES, AND METHODS FOR MODIFYING ARTICLES

(71) Applicant: GENERAL ELECTRIC COMPANY, Schenectady, NY (US)

(72) Inventor: Sabrina Michelle Puidokas, Baden (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 258 days.

(21) Appl. No.: 15/842,038

(22) Filed: Dec. 14, 2017

(65) Prior Publication Data

US 2019/0184498 A1 Jun. 20, 2019

(51) Int. Cl.
*B23K 1/00* (2006.01)
*B23K 35/02* (2006.01)
(Continued)

(52) U.S. Cl.
CPC .......... *B23K 35/025* (2013.01); *B22F 1/0018* (2013.01); *B22F 1/0044* (2013.01);
(Continued)

(58) Field of Classification Search
CPC ...... B22F 1/0059; B22F 1/0018; B22F 7/062; B23K 35/0244; B23K 35/025; B23K 35/3033

See application file for complete search history.

(56) References Cited

U.S. PATENT DOCUMENTS 5,443,658 A * 8/1995 Hermanek ........... B23K 35/025
148/23
5,759,301 A 6/1998 Konter et al.
(Continued)

OTHER PUBLICATIONS

Cheng, et al., Synthesis and characterization of cobalt nanoparticles through microwave polyol process, Wiley Online Library, AIChE Journal, vol. 55, Issue 6, Jun. 2009, 1383-1389, http://onlinelibrary.wiley.com/doi/10.1002/aic.11749/abstract, accessed on Nov. 27, 2017.
(Continued)

*Primary Examiner* — Erin B Saad
(74) *Attorney, Agent, or Firm* — McNees Wallace & Nurick LLC

(57) ABSTRACT

A nanoparticle powder is disclosed including a plurality of stabilized nanoparticles having a superalloy composition. At least about 90% of the particles have a convexity between about 0.980-1 and a circularity between about 0.850-1. A method for forming a braze paste is disclosed including mixing the plurality of stabilized nanoparticles with at least one organometallic precursor and up to about 5 wt % binder. A method for modifying an article is disclosed including applying the braze paste to a substrate including at least one crack, removing at least about 70% of the binder in the braze paste, and then applying additional braze paste over the first portion. Under vacuum or inert gas atmosphere, essentially all remaining binder is evaporated. The braze paste is brazed to the article at about 40-60% of the superalloy's bulk liquidus temperature, forming a brazed material and thereby sealing the at least one crack.

19 Claims, 1 Drawing Sheet

(51) Int. Cl.
| | |
|---|---|
| B22F 1/00 | (2006.01) |
| C22C 19/05 | (2006.01) |
| B23K 1/012 | (2006.01) |
| B23K 1/008 | (2006.01) |
| B23K 20/233 | (2006.01) |
| B23K 35/34 | (2006.01) |
| B23K 20/02 | (2006.01) |
| B23K 35/30 | (2006.01) |
| B23K 1/20 | (2006.01) |
| B23K 20/24 | (2006.01) |
| B22F 7/06 | (2006.01) |
| C22C 19/00 | (2006.01) |
| B23K 103/18 | (2006.01) |
| B23P 6/04 | (2006.01) |
| B23K 101/00 | (2006.01) |

(52) U.S. Cl.
CPC .......... *B22F 1/0048* (2013.01); *B22F 1/0059* (2013.01); *B22F 7/062* (2013.01); *B23K 1/00* (2013.01); *B23K 1/008* (2013.01); *B23K 1/0018* (2013.01); *B23K 1/012* (2013.01); *B23K 1/203* (2013.01); *B23K 20/021* (2013.01); *B23K 20/026* (2013.01); *B23K 20/233* (2013.01); *B23K 20/24* (2013.01); *B23K 35/0244* (2013.01); *B23K 35/3033* (2013.01); *B23K 35/3046* (2013.01); *B23K 35/34* (2013.01); *C22C 19/00* (2013.01); *C22C 19/05* (2013.01); *C22C 19/052* (2013.01); *B22F 2301/15* (2013.01); *B23K 2101/001* (2018.08); *B23K 2103/26* (2018.08); *B23P 6/045* (2013.01)

(56) References Cited

U.S. PATENT DOCUMENTS

| | | | | |
|---|---|---|---|---|
| 6,621,682 | B1* | 9/2003 | Takakuwa | H01G 4/228 361/306.3 |
| 7,416,108 | B2 | 8/2008 | Philip | |
| 7,653,996 | B2 | 2/2010 | Jungbluth et al. | |
| 7,938,919 | B2 | 5/2011 | Nazmy et al. | |
| 2001/0025418 | A1 | 10/2001 | Fernihough et al. | |
| 2004/0050913 | A1 | 3/2004 | Philip | |
| 2004/0126502 | A1* | 7/2004 | Ferrato | C04B 35/581 427/446 |
| 2007/0163684 | A1* | 7/2007 | Hu | C22C 1/0433 148/528 |
| 2009/0139607 | A1* | 6/2009 | Kool | B23K 35/0244 148/23 |
| 2009/0297882 | A1* | 12/2009 | Ikeda | B23K 35/34 428/675 |
| 2011/0296766 | A1* | 12/2011 | Sung | B01J 3/062 51/297 |
| 2013/0020377 | A1 | 1/2013 | Stankowski et al. | |
| 2014/0126155 | A1* | 5/2014 | Imamura | B23K 35/3006 361/715 |
| 2015/0129564 | A1* | 5/2015 | Kadau | B23K 1/0056 219/121.66 |
| 2015/0231742 | A1* | 8/2015 | Ziani | B23K 35/325 403/272 |
| 2016/0175998 | A1 | 6/2016 | Ozbaysal | |

OTHER PUBLICATIONS

Huang, et al., Preparation of fine nickel powders via reduction of nickel hydrazine complex precursors, Elsevier Science Press, ScienceDirect Transactions of Nonferrous Metals Society China 19 (2009) 389-393.

Vitta Corporation, Braz-Binder Gel Grade St; http://www.htk-hamburg.com/de/Produkte/Brazing-materials/Braz-Binder_Gel.html, accessed on Nov. 27, 2017.

2017 Wall Colmonoy, The Experts in High-Temperature Brazing, Brazing Aids, http://www.wallcolmonoy.com/products-capabilities/brazing-alloys/brazing-aids/, accessed on Nov. 27, 2017.

2016 Reade International Corporation, Your Specialty Chemicals Resource, Sol-Gel Materials, http://www.reade.com/products/sol-gel-materials, accessed on Nov. 11, 2017.

Hausner, Susan, Research Gate, Chemnitz University of Technology, Potential of nanosuspensions for joining (2015).

Bobzin, Prof. Dr.-Ing. K, Industrial Community Research on IGF project No. 17.907 N, Prevention of binder-related defects due to process-reliable processing of solder pastes, Germany 2016.

Din, Muhammad Imran, et al., Recent Advances in the Synthesis and Stabilization of Nickel and Nickel Oxide Nanoparticles: A green Adeptness, Hindawi Publishing Corporation, International Journal of Analytical Chemistry, vol. 2016, Article ID 3512145, 14 pages, http://dx.doi.org/10.1155/2016/3512145.

Lu, Yu, et al., High-Density Silver Nanoparticle Film with Temperature-Controllable Interparticle Spacing for a Tunable Surface Enhanced Raman Scattering Substrate, Nano Letters 2005, vol. 5, No. 1, 5-9, 2005 American Chemical Society.

Applied Nanotech, Inc., Research Services, http://www.pen-nanotech.com/a.n.i..html, accessed on Oct. 23, 2017.

Bobzin, Kirsten, et al., Influence of Filler and Base Material on the Pore Development during Reactive Air Brazing, Advanced Engineering Materials 2014, 16, No. 12., 2014 Wiley-VCH.

Nano-Join Technology, Oct. 17, 2017, http://www.nano-join.de/technologie/.

European Search Report issued in connection with corresponding EP Application No. 18211805, dated Apr. 2, 2019.

Mahander Pratap Singh and Chandan Srivastava, "Synthesis and Electron Microscopy of high Entropy Alloy Nanoparticles," Materials Letters vol. 160 (2015) 419-422, Dec. 1, 2015, Amsterdam, NL.

* cited by examiner

NANOPARTICLE POWDERS, METHODS FOR FORMING BRAZE PASTES, AND METHODS FOR MODIFYING ARTICLES

FIELD OF THE INVENTION

The present invention is directed to nanoparticle powders, methods for forming braze pastes, and methods for modifying articles. More particularly, the present invention is directed to nanoparticle powders, methods for forming braze pastes, and methods for modifying articles with stabilized nanoparticles having superalloy compositions and essentially spherical conformations.

BACKGROUND OF THE INVENTION

Gas turbines include components, such as buckets (blades), nozzles (vanes), combustors, shrouds, and other hot gas path components in which cracks and other undesirable features may form during formation or under operating conditions. Elimination of such cracks or other undesirable features may be inhibited by the materials from which the components are formed.

By way of example, certain gas turbine components include hard-to-weld (HTW) alloys due to desirable material properties, however, HTW alloys, due to their gamma prime and various geometric constraints, are susceptible to gamma prime strain aging, liquation and hot cracking, and are difficult to join when the gamma prime phase is present in volume fractions greater than about 30%, which may occur when aluminum or titanium content exceeds about 3%. As used herein, an "HTW alloy" is an alloy, which typically exhibits liquation, hot and strain-age cracking, and which is therefore impractical to weld in a repeatable manner without significant rework.

Additionally, even traditional brazing techniques may be difficult to apply to certain materials, such as directionally solidified and single crystal nickel-based superalloys due to the previously necessary inclusion of melting depressants in the braze materials to alloy brazing at temperatures, which do not induce recrystallization of the substrate. The inclusion of melting depressants is often undesirable due to the effects such melting depressants may have on the material characteristics of the substrate and the mechanical behavior of the brazed joint itself, as the melting depressants may lead to the formation of brittle phases. In order to dissolve such brittle phases, long dwell times at elevated temperatures (often above 800° C.) may be required to improve the mechanical performance of the joint to acceptable standards. Further, traditional brazing techniques may not adequately fill and seal cracks or other undesirably features. Narrow and branched cracks in particular may be difficult to be brazed in directionally solidified and single crystal substrates.

BRIEF DESCRIPTION OF THE INVENTION

In an exemplary embodiment, a nanoparticle powder includes a plurality of stabilized nanoparticles having a superalloy composition selected from the group consisting of nickel-based superalloys, cobalt-based superalloys, and combinations thereof. At least about 90% of the particles have a convexity of between about 0.980 to 1 and a circularity of between about 0.850 to 1. The nanoparticle powder has a tapped density of at least about 4 g/cm$^3$.

In another exemplary embodiment, a method for forming a braze paste includes mixing a plurality of stabilized nanoparticles with at least one organometallic precursor and up to about 5 wt % binder. The plurality of stabilized nanoparticles includes a superalloy composition and an essentially spherical conformation, the superalloy composition being selected from the group consisting of nickel-based superalloys, cobalt-based superalloys, and combinations thereof.

In another exemplary embodiment, a method for modifying an article includes mixing a plurality of stabilized nanoparticles including a superalloy composition and an essentially spherical conformation with at least one organometallic precursor and up to about 5 wt % binder to form a braze paste, the superalloy composition being selected from the group consisting of nickel-based superalloys, cobalt-based superalloys, and combinations thereof. A first portion of the braze paste is applied to a substrate of the article including at least one crack. At least about 70% of the binder in the first portion of the braze paste is removed. Following removing the at least about 70% of the binder in the first portion of the braze paste, a second portion of the braze paste is applied over the first portion of the braze paste. The article and the braze paste are placed under vacuum or an inert gas atmosphere. Essentially all of any remaining binder is evaporated at an evaporation temperature of the binder. The braze paste is brazed to the article at a brazing temperature between about 40% to about 60% of the bulk liquidus temperature of the superalloy for a brazing time of less than about 120 min. A brazed material is formed, thereby sealing the at least one crack.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
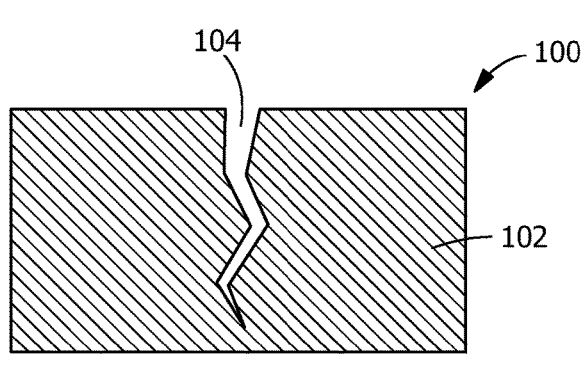
FIG. 1 is a cross-sectional view of an article including a crack, according to an embodiment of the present disclosure.

Provided are exemplary nanoparticle powders, methods for forming braze pastes, and methods for modifying articles with stabilized nanoparticles having superalloy compositions and essentially spherical conformations. Embodiments of the present disclosure, in comparison to articles and methods not utilizing one or more features disclosed herein, decrease costs, increase process efficiency, increase process speed, increase repeatability, lower brazing temperature, increase crack-sealing performance, improve mechanical loadability of the brazed crack, increase the portfolio of materials, which may be effectively modified, increase ability to repeatedly modify articles while reducing the risk of re-melting of previously modified cracks, increase modifiability of very narrow cracks, increase modifiability of branched cracks, minimize distortion from localized heating, or combinations thereof.

In one embodiment, a nanoparticle powder includes a plurality of stabilized nanoparticles having a superalloy composition and an essentially spherical conformation. The superalloy composition may include any suitable composition, including, but not limited to, nickel-based superalloys, cobalt-based superalloys, and combinations thereof. As used herein, "essentially spherical" indicates that at least about 80% of the plurality of stabilized nanoparticles includes a convexity of between about 0.975 to 1 and a circularity of between about 0.825 to 1. As used herein, "stabilized" indicates that the surfaces of the plurality of stabilized nanoparticles include a stabilizing surface treatment, such as, but not limited to, a stabilizer treatment. Specific suitable superalloy compositions may include, but are not limited to, CM-247LC, CMSX-4, ECY-768, FSX-414, GTD 111, GTD 222, GTD 444, HASTELLOY X, INCONEL 600, INCONEL 625, INCONEL 738, INCONEL 738LC, INCONEL 792, INCONEL 939, MAR-M-246, MAR-M-247, MAR-M-509, MK-4, MK-4HC, Rene 77, Rene 80, Rene 108, Rene 125, UDIMET 500, UDIMET 700, and X-45.

As used herein, "CM-247-LC" refers to an alloy including a composition, by weight, of about 5.4% to about 5.8% aluminum, about 7.9% to about 8.3% chromium, about 9% to about 9.4% cobalt, about 9.3% to about 9.7% tungsten, about 0.3% to about 0.7% molybdenum, about 3% to about 3.4% tantalum, about 0.5% to about 0.9% titanium, about 1.2% to about 1.6% hafnium, about 0.05% to about 0.09% carbon, and a balance of nickel. CM-247-LC is available from Cannon Muskegon, 2875 Lincoln Street, Muskegon, Mich. 49441.

As used herein, "CMSX-4" refers to an alloy including a composition, by weight, of about 5.4% to about 5.8% aluminum, about 6.3% to about 6.7% chromium, about 8.8% to about 9.2% cobalt, about 0.4% to about 0.8% molybdenum, about 6.3% to about 6.7% tantalum, about 0.8% to about 1.2% titanium, about 0.9% to about 1.1% hafnium, about 2.8% to about 3.2% rhenium, and a balance of nickel. CMSX-4 is available from Cannon Muskegon, 2875 Lincoln Street, Muskegon, Mich. 49441.

As used herein, "ECY-768" refers to an alloy including a composition, by weight, of about 0.35% to about 0.55% carbon, about 3% to about 4/5% tantalum, about 22% to about 25% chromium, about 9% to about 11% nickel, about 0.15% to about 0.5% titanium, about 6.5% to about 7.5% tungsten, about 0.1% to about 0.25% aluminum, and a balance of cobalt. ECY-768 is available from Westinghouse Electric Corporation, 20 Stanwix Street, Pittsburgh, Pa. 15222.

As used herein, "FSX-414" refers to an alloy including a composition, by weight, of about 27% to about 31% chromium, about 6% to about 8% tungsten, about 9% to about 11% nickel, about 0.15% to about 0.35% carbon, and a balance of cobalt. FSX-414 is commercially available under that designation.

As used herein, "GTD 111" refers to an alloy including a composition, by weight, of about 13.5% to about 14.5% chromium, about 9% to about 10% cobalt, about 3.3% to about 4.3% tungsten, about 4.4% to about 5.4% titanium, about 2.5% to about 3.5% aluminum, about 0.05% to about 0.15% iron, about 2.3% to about 3.3% tantalum, about 1.1% to about 2.1% molybdenum, about 0.05% to about 0.15% carbon, and a balance of nickel. GTD 111 is available from General Electric Company, 1 River Road, Schenectady, N.Y. 12345.

As used herein, "GTD 222" refers to an alloy including a composition, by weight, of about 22.5% to about 24.5% chromium, about 18% to about 20% cobalt, about 1.5% to about 2.5% tungsten, about 0.3% to about 1.3% niobium, about 1.8% to about 2.8% titanium, about 0.7% to about 1.7% aluminum, about 0.5% to about 1.5% tantalum, about 0.15% to about 0.35% silicon, about 0.05% to about 0.15% manganese, and a balance of nickel. GTD 222 is available from General Electric Company, 1 River Road, Schenectady, N.Y. 12345.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel. GTD 444 is available from General Electric Company, 1 River Road, Schenectady, N.Y. 12345.

As used herein, "HASTELLOY X" refers to an alloy including a composition, by weight, of about 21% to about 23% chromium, about 17% to about 19% iron, about 8% to about 10% molybdenum, about 1% to about 2% cobalt, about 0.4% to about 0.8% tungsten, about 0.08% to about 0.12% carbon, and a balance of nickel. HASTELLOY X is available from Haynes International, 1020 W. Park Avenue, Kokomo, Ind., 46904-9013.

As used herein, "INCONEL 600" refers to an alloy including a composition, by weight, of about 14% to about 17% chromium, about 6% to about 10% iron, and a balance of nickel. INCONEL 600 is available from Special Metals Corporation, 3200 Riverside Drive, Huntington, W. Va. 25720.

As used herein, "INCONEL 625" refers to an alloy including a composition, by weight, of about 20% to about 23% chromium, about 8% to about 10% molybdenum, about 3.15% to about 4.15% niobium and tantalum, up to about 5% iron, up to about 0.1% carbon, up to about 0.5% manganese, up to about 0.5% silicon, up to about 0.015% phosphorous, up to about 0.015% sulfur, up to about 0.4% aluminum, up to about 0.4% titanium, up to about 1% cobalt, and a balance of nickel. INCONEL 625 is available from Special Metals Corporation, 3200 Riverside Drive, Huntington, W. Va. 25720.

As used herein, "INCONEL 738" refers to an alloy including a composition, by weight, of about 15.7% to about 16.3% chromium, about 8% to about 9% cobalt, about 1.5% to about 2.0% molybdenum, about 3.2% to about 3.7% aluminum, about 3.2% to about 3.7% titanium, about 1.5% to about 2.0% tantalum, about 2.4% to about 2.8% tungsten, about 0.15% to 0.20% carbon, about 0.6% to about 1.1% niobium, and a balance of nickel. INCONEL 738 is available from Special Metals Corporation, 3200 Riverside Drive, Huntington, W. Va. 25720.

As used herein, "INCONEL 738LC" refers to an alloy including a composition, by weight, of about 15% to about 17% chromium, about 8% to about 9% cobalt, about 1.6% to about 1.8% molybdenum, about 3.4% to about 3.6% aluminum, about 3.4% to about 3.6% titanium, about 1.6% to about 1.8% tantalum, about 2.4% to about 2.6% tungsten, about 0.07% to 0.11% carbon, about 1.5% to about 2.5% niobium, and a balance of nickel. INCONEL 738LC is available from Special Metals Corporation, 3200 Riverside Drive, Huntington, W. Va. 25720.

As used herein, "INCONEL 792" refers to an alloy including a composition, by weight, of about 12% to about 13% chromium, about 8% to about 10% cobalt, about 1.5% to about 2.5% molybdenum, about 2.5% to about 4% aluminum, about 3.5% to about 5% titanium, about 3.5% to about 5% tantalum, about 3.5% to about 4.5% tungsten, and a balance of nickel. INCONEL 792 is available from Special Metals Corporation, 3200 Riverside Drive, Huntington, W. Va. 25720.

As used herein, "INCONEL 939" refers to an alloy including a composition, by weight, of about 21% to about 24% chromium, about 18% to about 20% cobalt, about 1.7% to about 2.1% aluminum, about 3.6% to about 3.8% titanium, about 1.3% to about 1.5% tantalum, about 1.5% to about 1.7% tungsten, about 0.09% to about 0.11% zirconium, about 0.1% to 0.2% carbon, about 0.8% to about 1.2% niobium, and a balance of nickel. INCONEL 939 is available from Special Metals Corporation, 3200 Riverside Drive, Huntington, W. Va. 25720.

As used herein, "MAR-M-246" refers to an alloy including a composition, by weight, of about 5.3% to about 5.7% aluminum, about 8% to about 10% chromium, about 9% to about 11% cobalt, about 9% to about 11% tungsten, about 2% to about 3% molybdenum, about 1% to about 2% titanium, about 1% to about 2% tantalum, about 0.05% to about 0.25% carbon, and a balance of nickel. MAR-M-246 is available from MetalTek International, 905 E. St. Paul Avenue, Waukesha, Wis. 53188.

As used herein, "MAR-M-247" refers to an alloy including a composition, by weight, of about 5.4% to about 5.7% aluminum, about 8% to about 8.5% chromium, about 9% to about 9.5% cobalt, about 9.3% to about 9.7% tungsten, about 0.05% to about 0.15% manganese, about 0.15% to about 0.35% silicon, about 0.06% to about 0.09% carbon, and a balance of nickel. MAR-M-247 is available from MetalTek International, 905 E. St. Paul Avenue, Waukesha, Wis. 53188.

As used herein, "MAR-M-509" refers to an alloy including a composition, by weight, of about 9% to about 11% nickel, about 22.5% to about 24.5% chromium, about 0.15% to about 0.25% titanium, about 3% to about 4% tantalum, about 6% to about 8% tungsten, about 0.4% to about 0.6% zirconium, about 0.5% to about 0.7% carbon, and a balance of cobalt. MAR-M-509 is available from MetalTek International, 905 E. St. Paul Avenue, Waukesha, Wis. 53188.

As used herein, "MK-4" refers to an alloy including a composition, by weight, of about 6.3% to about 6.6% chromium, about 9.3% to about 10% cobalt, about 0.5% to about 0.7% molybdenum, about 6.2% to about 6.6% tungsten, about 6.3% to about 6.7% tantalum, about 2.8% to about 3.1% rhenium, about 5.45% to about 5.75% aluminum, about 0.9% to about 1.1% titanium, about 0.17% to about 0.23% hafnium, and a balance of nickel. MK-4 is commercially available under that designation.

As used herein, "MK-4HC" refers to an alloy including a composition, by weight, of about 6.3% to about 6.7% chromium, about 9.5% to about 9.9% cobalt, about 0.5% to about 0.7% molybdenum, about 6.2% to about 6.6% tungsten, about 6.3% to about 6.7% tantalum, about 2.8% to about 3.2% rhenium, about 5.45% to about 5.75% aluminum, about 0.9% to about 1.1% titanium, about 0.17% to about 0.23% hafnium, and a balance of nickel. MK-4HC is commercially available under that designation.

As used herein, "Rene 77" refers to an alloy including a composition, by weight, of about 14% to about 16% chromium, about 16% to about 18% cobalt, about 5% to about 6% molybdenum, about 3% to about 4% titanium, about 3.7% to about 4.7% aluminum, and a balance of nickel. Rene 77 is commercially available under that designation.

As used herein, "Rene 80" refers to an alloy including a composition, by weight, of about 13% to about 15% chromium, about 8.5% to about 10.5% cobalt, about 3% to about 5% molybdenum, about 3% to about 5% tungsten, about 4% to about 6% titanium, about 2.5% to about 3.5% aluminum, about 0.05% to about 0.25% carbon, and a balance of nickel. Rene 80 is commercially available under that designation.

As used herein, "Rene 108" refers to an alloy including a composition, by weight, of about 7.9% to about 8.9% chromium, about 9% to about 10% cobalt, about 5% to about 6% aluminum, about 0.5% to about 0.9% titanium, about 9% to about 10% tungsten, about 0.3% to about 0.7% molybdenum, about 2.5% to about 3.5% tantalum, about 1% to about 2% hafnium and a balance of nickel. Rene 108 is commercially available under that designation.

As used herein, "Rene 125" refers to an alloy including a composition, by weight, of about 8% to about 9% chromium, about 9% to about 11% cobalt, about 4.3% to about 5.3% aluminum, up to about 2% to about 3% titanium, about 7% to about 9% tungsten, up to about 1.5% to about 2.5% molybdenum, about 3.3% to about 4.3% tantalum, about 0.9% to about 1.9% hafnium, about 0.05% to about 0.15% carbon, and a balance of nickel. Rene 125 is commercially available under that designation.

As used herein, "UDIMET 500" refers to an alloy including a composition, by weight, of about 17 to about 20% chromium, about 17% to about 20% cobalt, about 3% to about 5% molybdenum, about 2.5% to about 3.5% titanium, about 2.5% to about 3.5% aluminum, and a balance of nickel. UDIMET 500 is commercially available under that designation.

As used herein, "UDIMET 700" refers to an alloy including a composition, by weight, of about 14% to about 16% chromium, about 17% to about 20% cobalt, about 4% to about 6% molybdenum, about 3% to about 4% titanium, about 4% to about 5% aluminum, about 0.05% to about 0.10% carbon, about 0.015% to about 0.035% boron, and a balance of nickel. UDIMET 700 is commercially available under that designation.

As used herein, "X-45" refers to an alloy including a composition, by weight, of about 9% to about 11% nickel, about 24% to about 26% chromium, about 7% to about 8% tungsten, about 0.4% to about 0.6% manganese, about 0.8% to about 1% silicon, and a balance of cobalt. X-45 is commercially available under that designation.

In one embodiment, the plurality of stabilized nanoparticles includes a tapped density of at least about 4 g/cm$^3$, alternatively at least about 4.5 g/cm$^3$, alternatively at least about 5 g/cm$^3$, alternatively at least about 5.5 g/cm$^3$, alternatively at least about 6 g/cm$^3$.

In one embodiment, at least about 90%, alternatively at least about 95%, of the plurality of stabilized nanoparticles includes a convexity of between about 0.980 to 1, alternatively between about 0.985 to 1, alternatively between about 0.990 to 1, alternatively between about 0.995 to 1.

In one embodiment, at least about 90%, alternatively at least about 95%, of the plurality of stabilized nanoparticles includes a circularity of between about 0.850 to 1, alternatively between about 0.860 to 1, alternatively between about 0.870 to 1, alternatively between about 0.880 to 1, alternatively between about 0.890 to 1, alternatively between about 0.900 to 1, alternatively between about 0.910 to 1, alternatively between about 0.920 to 1, alternatively between about 0.930 to 1, alternatively between about 0.940 to 1, alternatively between about 0.950 to 1, alternatively between about 0.960 to 1, alternatively between about 0.970 to 1, alternatively between about 0.980 to 1, alternatively between about 0.985 to 1, alternatively between about 0.990 to 1, alternatively between about 0.995 to 1.

The plurality of stabilized nanoparticles may include any suitable range of particle size, including, but not limited to, a range of up to about 50 nm, alternatively between about 10 nm to about 50 nm, alternatively between about 10 nm to about 30 nm, alternatively between about 15 nm to about 35 nm, alternatively between about 20 nm to about 40 nm, alternatively between about 25 nm to about 45 nm, alternatively between about 30 nm to about 50 nm, alternatively between about 10 nm to about 20 nm, alternatively between about 15 nm to about 25 nm, alternatively between about 20 nm to about 30 nm, alternatively between about 25 nm to about 35 nm, alternatively between about 30 nm to about 40 nm, alternatively between about 35 nm to about 45 nm, alternatively between about 40 nm to about 50 nm.

The plurality of stabilized nanoparticles may be formed by any suitable method. In one embodiment, forming the plurality of stabilized nanoparticles includes precipitating the stabilized nanoparticles with at least one stabilizer. Suitable stabilizers include, but are not limited to, fatty acids, such as lauric acid, thiols such as alkyl thiols, or combinations thereof.

Forming the plurality of stabilized nanoparticles may include a sol-gel process. In one embodiment, the sol-gel process is a solution process for manufacturing advanced materials in a wide variety of forms, including, but not limited to, ultrafine or spherical shaped powders and thin films. The sol-gel process may include the transition of a solution system from a liquid colloidal suspension (a "sol") into a solid (a "gel") phase. In one embodiment, the starting materials used in the preparation of the sol include inorganic metal salts, metal organic compounds, or combinations thereof, which are subjected to a series of hydrolysis and polymerization reactions to form the sol. Further processing of the sol may form products in a variety of forms.

Forming the plurality of stabilized nanoparticles may further include sintering the plurality of stabilized nanoparticles at a sintering temperature for a sintering cycle duration. Suitable sintering temperatures include, but are not limited to, between about 200° C. to about 300° C., alternatively between about 220° C. to about 280° C., alternatively between about 200° C. to about 250° C., alternatively between about 225° C. to about 275° C., alternatively between about 250° C. to about 300° C. In one embodiment, the sintering temperature is about one-quarter of the bulk liquidus temperature of the superalloy. In another embodiment, the sintering temperature is about one-quarter of the bulk solidus temperature of the superalloy. Suitable sintering cycle durations include, but are not limited to, between about 10 min to about 60 min, alternatively between about 10 min to about 40 min, alternatively between about 10 min to about 30 min, alternatively between about 20 min to about 40 min, alternatively between about 30 min to about 50 min, alternatively between about 40 min to about 60 min.

In one embodiment, a method for forming a braze paste 200 includes forming the plurality of stabilized nanoparticles and mixing the plurality of stabilized nanoparticles with at least one organometallic precursor and up to about 5 wt % binder, alternatively up to about 4 wt % binder, alternatively up to about 3 wt % binder, alternatively up to about 1 wt % binder, alternatively between about 0.1 wt % binder and about 5 wt % binder, alternatively between about 0.1 wt % binder and about 1 wt % binder, alternatively between about 0.5 wt % binder and about 1.5 wt % binder, alternatively between about 1 wt % binder and about 2 wt % binder, alternatively between about 1.5 wt % binder and about 2.5 wt % binder, alternatively between about 2 wt % binder and about 3 wt % binder, alternatively between about 2.5 wt % binder and about 3.5 wt % binder, alternatively between about 3 wt % binder and about 4 wt % binder, alternatively between about 3.5 wt % binder and about 4.5 wt % binder, alternatively between about 4 wt % binder and about 5 wt % binder.

Suitable binder may include, but are not limited to, water-based binders, alcohol-based binders, solvent-based binders, or combinations thereof. Specific binders may include, but are not limited to, Braz-Binder Gel form BITTA and S' BINDERS from Wallcolmonoy.

The at least one organometallic precursor may include any suitable composition. Suitable compositions for the at least one organometallic precursor include, but are not limited to, $Ni(NO_3)$, nickel hydrazine complex ($[Ni(N_2H_4)_2]Cl_2$), cobalt (II) acetate ($Co(C_2H_3O_2)_2 \cdot 4H_2O$ or $Co(CH_2COO)_2 \cdot 4H_2O$), or combinations thereof. In one embodiment, a carbon-bound metal of the at least one organometallic precursor is a base metal of the superalloy composition. Without being bound by theory, it is believed that the at least one organometallic precursor may produce nanopowder in situ during a brazing process.

Forming the braze paste 200 may include mixing a plurality of microparticles with binder and precursors to produce the braze paste, the plurality of microparticles including a superalloy composition. The superalloy composition of the plurality of microparticles may be the same as the superalloy composition of the plurality of stabilized nanoparticles or distinct from the superalloy composition of the plurality of stabilized nanoparticles. Suitable superalloy compositions for the plurality of microparticles include, but are not limited to, nickel-based superalloys, cobalt-based superalloys, and combinations thereof. Specific suitable superalloy compositions for the plurality of microparticles may include, but are not limited to, CM-247LC, CMSX-4, ECY-768, FSX-414, GTD 111, GTD 222, HASTELLOY X, INCONEL 738LC, INCONEL 792, INCONEL 939, MAR-M-247, MAR-M-509, MK-4, MK-4HC, Rene 108, and X-45. The plurality of microparticles may constitute any suitable portion of the braze paste 200, including, but not limited to, between about 1 wt % to about 60 wt %, alternatively between about 5 wt % to about 60 wt %, alternatively between about 10 wt % to about 60 wt %, alternatively between about 1 wt % to about 20 wt %, alternatively between about 10 wt % to about 30 wt %, alternatively between about 20 wt % to about 40 wt %, alternatively between about 30 wt % to about 50 wt %, alternatively between about 40 wt % to about 60 wt %, alternatively between about 50 wt % to about 60 wt %.

Figure 2:
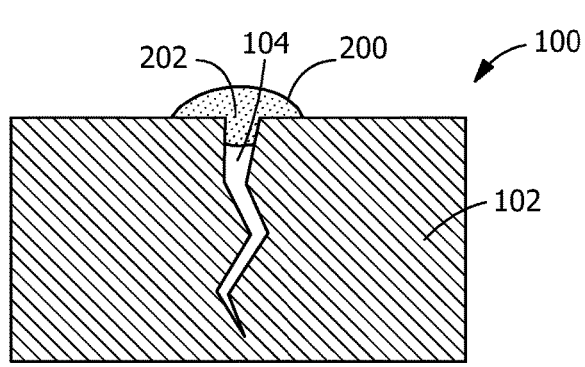
FIG. 2 is a cross-sectional view of the article of FIG. 1 following application of a first portion of a braze paste, according to an embodiment of the present disclosure.

Referring to FIGS. 1-2, in one embodiment, a method for modifying an article 100 includes applying a first portion 202 of the braze paste 200 to a substrate 102 of the article 100 including at least one crack 104. At least a portion of the braze paste 200 may be infiltrated into the at least one crack 104. The at least one crack 104 may be branched or unbranched. The article 100 may be any suitable article, including, but not limited to, a turbine component, a gas turbine component, a hot gas path turbine component, a nozzle (also referred to as a vane), a bucket (also referred to as a blade), an airfoil, a shroud, a combustor, a combustion liner, a transition piece, a rotating turbine component, a wheel, a seal, and combinations thereof.

The substrate 102 may have any suitable composition, including but not limited to nickel-based superalloys, cobalt-based superalloys, and combinations thereof. Specific suitable superalloy compositions for the substrate 102 may include, but are not limited to, CM-247LC, CMSX-4, ECY-768, FSX-414, GTD 111, GTD 222, GTD 444, HASTELLOY X, INCONEL 600, INCONEL 625, INCONEL 738, INCONEL 738LC, INCONEL 792, INCONEL 939, MAR-M-246, MAR-M-247, MAR-M-509, MK-4, MK-4HC, Rene 77, Rene 80, Rene 108, Rene 125, UDIMET 500, UDIMET 700, and X-45. The composition of the substrate 102 may be the same as the superalloy composition of the plurality of stabilized nanoparticles or distinct from the superalloy composition of the plurality of stabilized nanoparticles.

Figure 3:
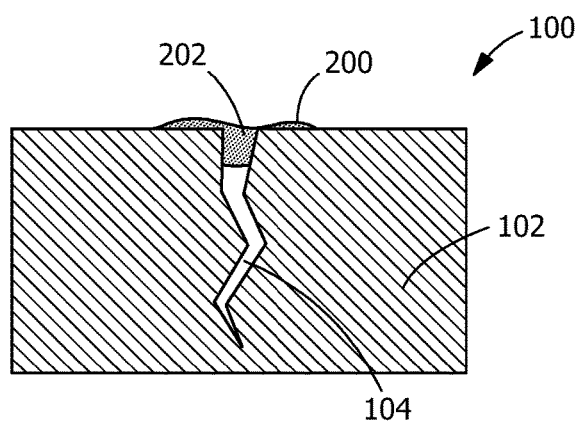
FIG. 3 is a cross-sectional view of the article of FIG. 2 following removal of binder from the braze paste, according to an embodiment of the present disclosure.

Referring to FIGS. 2-3, in one embodiment, at least about 70% of the binder in the first portion 202 of the braze paste 200 is removed, alternatively at least about 75% of the binder, alternatively at least about 80% of the binder, alternatively at least about 85% of the binder, alternatively at least about 90% of the binder, alternatively at least about 95% of the binder, alternatively at least about 98% of the binder.

Removing binder from the first portion 202 of the braze paste 200 may include any suitable drying protocol. In one embodiment, the drying protocol includes at least one drying cycle at a drying temperature for a drying cycle duration, alternatively a plurality of drying cycles, alternatively at least three drying cycles, alternatively any additional number of drying cycles. The at least one drying cycle may include at least one air drying cycle under air atmosphere, at least one inert drying cycle under vacuum or inert gas, or combinations thereof. Suitable inert gasses include, but are not limited to, nitrogen, helium, argon, or combinations thereof. In one embodiment, wherein the at least one drying cycle includes an at least one air drying cycle, the suitable temperatures for the first drying temperature include, but are not limited to, a temperature between about 100° C. to about 220° C., alternatively between about 110° C. to about 210° C., alternatively between about 120° C. to about 200° C., alternatively between about 100° C. to about 150° C., alternatively between about 125° C. to about 175° C., alternatively between about 150° C. to about 200° C., alternatively between about 175° C. to about 220° C. In another embodiment, wherein the at least one drying cycle includes an at least one inert drying cycle, the suitable temperatures for the first drying temperature include, but are not limited to, a temperature between about 200° C. to about 300° C., alternatively between about 210° C. to about 280° C., alternatively between about 200° C. to about 250° C., alternatively between about 225° C. to about 275° C., alternatively between about 250° C. to about 300° C. In one embodiment, the at least one drying cycle duration is between about 10 min to about 60 min, alternatively between about 10 min to about 40 min, alternatively between about 10 min to about 30 min, alternatively between about 20 min to about 40 min, alternatively between about 30 min to about 50 min, alternatively between about 40 min to about 60 min.

Figure 4:
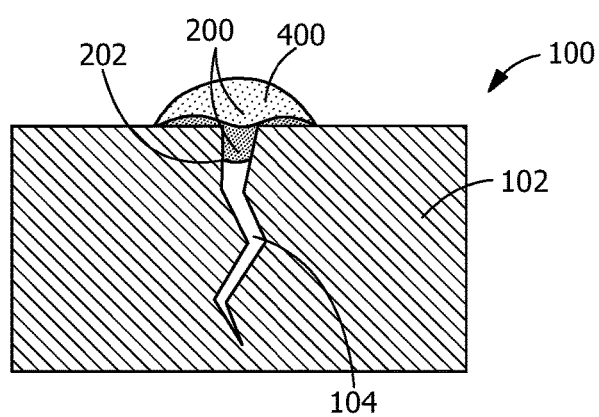
FIG. 4 is a cross-sectional view of the article of FIG. 3 following application of a second portion of a braze paste, according to an embodiment of the present disclosure.

Referring to FIGS. 3-4, following removing binder from the first portion 202 of the braze paste 200, in one embodiment a second portion 400 of the braze paste 200 is applied over the first portion 202 of the braze paste 200. Any suitable amount of the braze paste 200 may be applied as the second portion 400, including, but not limited to, by weight, between about 10% to about 40% of the first portion 202, alternatively between about 10% to about 20% of the first portion 202, alternatively between about 15% to about 25% of the first portion 202, alternatively between about 20% to about 30% of the first portion 202, alternatively between about 25% to about 35% of the first portion 202, alternatively between about 30% to about 40% of the first portion 202.

In one embodiment, at least about 70% of the binder in the second portion 400 of the braze paste 200 is removed, alternatively at least about 75% of the binder, alternatively at least about 80% of the binder, alternatively at least about 85% of the binder, alternatively at least about 90% of the binder, alternatively at least about 95% of the binder, alternatively at least about 98% of the binder, alternatively at least about 99% of the binder. Removing binder from the second portion 400 of the braze paste 200 may include the drying protocol.

Figure 5:
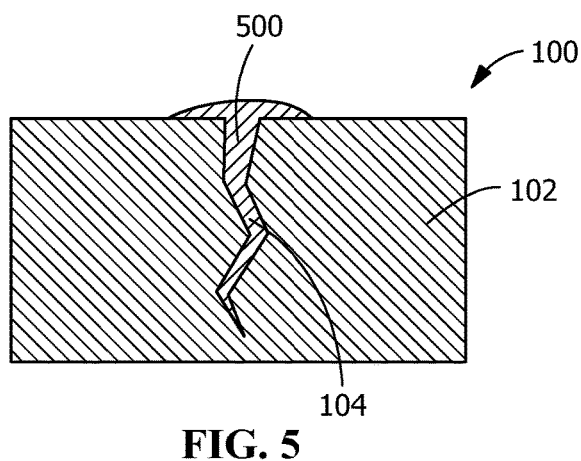
FIG. 5 is a cross-sectional view of the article of FIG. 4 following brazing of the article with the braze paste, according to an embodiment of the present disclosure.

Referring to FIGS. 4-5, in one embodiment the article 100 and the braze paste 200 are placed under vacuum or an inert gas atmosphere, and essentially all of any remaining binder is evaporated at an evaporation temperature of the binder. As used herein, "essentially all of any remaining binder is evaporated" indicates that at least 98%, alternatively at least about 99%, alternatively at least about 99.5%, alternatively at least about 99.9%, alternatively at least about 99.99%.

The braze paste 200 is brazed to the article 100 at any suitable brazing temperature, including, but not limited to, a brazing temperature between about 700° C. to about 1,000° C., alternatively between about 750° C. to about 950° C., alternatively between about 700° C. to about 800° C., alternatively between about 750° C. to about 850° C., alternatively between about 800° C. to about 900° C., alternatively between about 850° C. to about 950° C., alternatively between about 900° C. to about 1,000° C. In one embodiment, the brazing temperature is between about 40% to about 60% of the bulk liquidus temperature of the superalloy of the plurality of stabilized nanoparticles, alternatively between about 40% to about 50% of the bulk liquidus temperature, alternatively between about 45% to about 55% of the bulk liquidus temperature, alternatively between about 50% to about 60% of the bulk liquidus temperature, alternatively between about 40% to about 60% of the bulk solidus temperature, alternatively between about 40% to about 50% of the bulk solidus temperature, alternatively between about 45% to about 55% of the bulk solidus temperature, alternatively between about 50% to about 60% of the bulk solidus temperature.

The brazing may proceed for any suitable brazing time during which the brazing temperature is maintained, including, but not limited to, a brazing time of less than about 120 min, alternatively less than about 110 min, alternatively less than about 100 min, alternatively less than about 90 min, alternatively less than about 80 min, alternatively less than about 70 min, alternatively less than about 60 min, alternatively less than about 50 min, alternatively less than about 40 min, alternatively less than about 30 min, alternatively less than about 20 min, alternatively less than about 10 min.

In one embodiment, wherein the at least one crack 104 includes a crack width of less than about 0.25 mm when the substrate 102 is conventionally cast or less than about 0.10 mm when the substrate 102 is directionally solidified or single crystal, the brazing time is between about 45 min to about 120 min, alternatively between about 60 min to about 100 min, alternatively between about 45 min to about 75 min, alternatively between about 60 min to about 90 min, alternatively between about 75 min to about 105 min, alternatively between about 90 min to about 120 min.

In another embodiment, wherein the at least one crack 104 includes a crack width of greater than about 0.25 mm when the substrate 102 is conventionally cast or greater than about 0.10 mm when the substrate 102 is directionally solidified or single crystal, the brazing time is between about 10 min to about 60 min, alternatively between about 20 min to about 50 min, alternatively between about 10 min to about 30 min, alternatively between about 20 min to about 40 min, alternatively between about 30 min to about 60 min.

Brazing the braze paste 200 to the article 100 forms a brazed material 500 within the at least one crack 104, sealing the at least one crack 104. The brazed material 500 is essentially free of pores with diameters greater than about 5 μm. As used herein, "essentially free of pores" indicates that less than about 5% of any pores present exceed the identified diameters, alternatively less than about 4%, alternatively less than about 3%, alternatively less than about 2%, alternatively less than about 1%, alternatively less than about 0.1%, alternatively less than about 0.01%.

In one embodiment, brazing the braze paste 200 to the article 100 further includes hot isostatic pressing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment disclosed as the best mode contemplated for carrying out this invention, but that the invention will include all embodiments falling within the scope of the appended claims.

What is claimed is:

1. A method for modifying an article, comprising:
    mixing a plurality of stabilized nanoparticles including a superalloy composition and an essentially spherical conformation with at least one organometallic precursor and up to about 5 wt % binder to form a braze paste, the superalloy composition being selected from the group consisting of nickel-based superalloys, cobalt-based superalloys, and combinations thereof;
    applying a first portion of the braze paste to a substrate of the article including at least one crack;
    removing at least about 70% of the binder in the first portion of the braze paste;
    following removing the at least about 70% of the binder in the first portion of the braze paste, applying a second portion of the braze paste over the first portion of the braze paste;
    placing the article and the braze paste under vacuum or an inert gas atmosphere;
    evaporating essentially all of any remaining binder at an evaporation temperature of the binder; and
    brazing the braze paste to the article at a brazing temperature between about 40% to about 60% of the bulk liquidus temperature of the superalloy for a brazing time of less than about 120 min,
    wherein the brazing of the braze paste to the article forms a brazed material and seals the at least one crack.

2. The method of claim 1, wherein the brazed material is essentially free of pores with diameters greater than about 5 μm within the at least one sealed crack.

3. The method of claim 1, wherein removing at least about 70% of the binder in the first portion of the braze paste includes at least one drying cycle at a drying temperature of between about 100° C. to about 300° C. for a drying cycle duration of about 10 min to about 60 min.

4. The method of claim 3, wherein the at least one drying cycle includes at least one of an air drying cycle under air atmosphere with the drying temperature between about 100° C. to about 220° C. and an inert drying cycle under vacuum or inert gas with the drying temperature between about 200° C. to about 300° C.

5. The method of claim 1, wherein the plurality of stabilized nanoparticles further includes a range of particle size of up to about 50 nm.

6. The method of claim 1, wherein a carbon-bound metal of the at least one organometallic precursor is a base metal of the superalloy composition.

7. The method of claim 1, wherein the plurality of stabilized nanoparticles includes a tapped density of at least about 4 g/cm$^3$.

8. The method of claim 1, wherein at least about 90% of the plurality of nanoparticles includes a convexity of between about 0.980 to 1 and a circularity of between about 0.850 to 1.

9. The method of claim 1, wherein the brazing temperature is between about 700° C. to about 1,000° C.

10. The method of claim 1, wherein the at least one crack includes a crack width of less than about 0.25 mm when the substrate is conventionally cast or less than about 0.10 mm when the substrate is directionally solidified or single crystal, and the brazing time is between about 10 min to about 60 min.

11. The method of claim 1, wherein the at least one crack includes a crack width of greater than about 0.25 mm when the substrate is conventionally cast or greater than about 0.10 mm when the substrate is directionally solidified or single crystal, and the brazing time is between about 45 min to about 120 min.

12. The method of claim 1, wherein the braze paste further includes a plurality of microparticles, and the plurality of microparticles include the superalloy composition.

13. A method for forming a braze paste, comprising:
    mixing a plurality of stabilized nanoparticles with at least one organometallic precursor and up to about 5 wt % binder,
    wherein the plurality of stabilized nanoparticles includes a superalloy composition and an essentially spherical conformation, the superalloy composition being selected from the group consisting of nickel-based superalloys, cobalt-based superalloys, and combinations thereof.

14. The method of claim 13, further including forming the plurality of stabilized nanoparticles, wherein forming the plurality of stabilized nanoparticles includes precipitating the plurality of stabilized nanoparticles with at least one stabilizer.

15. The method of claim 14, wherein the at least one stabilizer is selected from the group consisting of fatty acids, thiols, and combinations thereof.

16. The method of claim 13, further including forming the plurality of stabilized nanoparticles, wherein forming the plurality of stabilized nanoparticles includes a sol-gel process.

17. The method of claim 13, further including forming the plurality of stabilized nanoparticles, wherein forming the plurality of stabilized nanoparticles includes sintering the plurality of stabilized nanoparticles at a sintering temperature for a sintering cycle duration.

18. The method of claim 17, wherein the sintering temperature is about one-quarter of the bulk liquidus temperature of the superalloy.

19. The method of claim 17, wherein the sintering temperature is between about 200° C. to about 300° C. and the sintering cycle duration is between about 10 min to about 60 min.

* * * * *